United States Patent
Doi et al.

(10) Patent No.: US 9,024,886 B2
(45) Date of Patent: May 5, 2015

(54) TOUCH-PANEL DEVICE

(75) Inventors: Koji Doi, Tachikawa (JP); Norio Mamba, Kawasaki (JP); Koji Nagata, Hachioji (JP); Toshiyuki Kumagai, Mobara (JP); Koji Hayakawa, Chosei (JP)

(73) Assignees: Japan Display Inc., Tokyo (JP); Panasonic Liquid Crystal Display Co., Ltd., Himeji-Shi, Hyogo-Ken (JP)

( * ) Notice: Subject to any disclaimer, the term of this patent is extended or adjusted under 35 U.S.C. 154(b) by 240 days.

(21) Appl. No.: 12/759,045

(22) Filed: Apr. 13, 2010

(65) Prior Publication Data

US 2010/0259504 A1  Oct. 14, 2010

(30) Foreign Application Priority Data

Apr. 14, 2009 (JP) ................................. 2009-098235
Aug. 27, 2009 (JP) ................................. 2009-196958

(51) Int. Cl.
| | |
|---|---|
| G06F 3/041 | (2006.01) |
| G06F 3/045 | (2006.01) |
| G06F 3/042 | (2006.01) |
| G06F 3/044 | (2006.01) |

(52) U.S. Cl.
CPC .............. *G06F 3/044* (2013.01); *G06F 3/0418* (2013.01)

(58) Field of Classification Search
CPC ................................ G06F 3/044; G06F 3/0418
USPC .................................................. 345/173–175
See application file for complete search history.

(56) References Cited

U.S. PATENT DOCUMENTS

| | | | | |
|---|---|---|---|---|
| 5,510,805 | A * | 4/1996 | Lee ................................. | 345/58 |
| 5,825,352 | A * | 10/1998 | Bisset et al. .................. | 345/173 |
| 6,040,824 | A * | 3/2000 | Maekawa et al. ............. | 345/173 |
| 6,211,856 | B1 * | 4/2001 | Choi et al. ..................... | 345/666 |
| 6,323,846 | B1 * | 11/2001 | Westerman et al. .......... | 345/173 |
| 6,411,283 | B1 * | 6/2002 | Murphy ......................... | 345/173 |
| 6,727,892 | B1 * | 4/2004 | Murphy ......................... | 345/173 |

(Continued)

FOREIGN PATENT DOCUMENTS

| | | |
|---|---|---|
| CN | 101387927 | 3/2009 |
| JP | 07-230352 | 8/1995 |

(Continued)

OTHER PUBLICATIONS

Partial European Search Report in EP 10003950, dated Jul. 8, 2013 and annex to the European Search Report (6 pgs.).

(Continued)

*Primary Examiner* — Kumar Patel
*Assistant Examiner* — Sejoon Ahn
(74) *Attorney, Agent, or Firm* — Lowe Hauptman & Ham, LLP

(57) ABSTRACT

Provided is a touch-panel device capable of detecting a touched position with high accuracy even when a touched area extends off an electrode area. In one embodiment, the touched area is assumed to be, for example, circular in shape. A width in an X direction (overlap width) and a width in a Y direction (overlap width) of an overlap area where the touched area in a circular shape and an electrode area overlap each other is determined based on sensor measured values. When the overlap width and the overlap width are different from each other, it is judged that the touched area extends off the electrode area, and a position of a center of the touched area in the circular shape is calculated as the touched position.

10 Claims, 9 Drawing Sheets

(56) References Cited

U.S. PATENT DOCUMENTS

| | | | |
|---|---|---|---|
| 7,030,860 B1* | 4/2006 | Hsu et al. | 345/173 |
| 7,489,306 B2* | 2/2009 | Kolmykov-Zotov et al. | 345/173 |
| 7,663,607 B2* | 2/2010 | Hotelling et al. | 345/173 |
| 7,800,593 B2* | 9/2010 | Ohta | 345/173 |
| 7,844,914 B2* | 11/2010 | Andre et al. | 715/773 |
| 7,916,126 B2* | 3/2011 | Westerman et al. | 345/173 |
| 7,924,271 B2* | 4/2011 | Christie et al. | 345/173 |
| 7,990,368 B2* | 8/2011 | Lee et al. | 345/178 |
| 8,121,283 B2* | 2/2012 | Peng et al. | 379/433.07 |
| 8,154,529 B2* | 4/2012 | Sleeman et al. | 345/173 |
| 8,243,027 B2* | 8/2012 | Hotelling et al. | 345/173 |
| 8,284,170 B2* | 10/2012 | Bernstein | 345/174 |
| 8,334,849 B2* | 12/2012 | Murphy et al. | 345/173 |
| 8,477,106 B2* | 7/2013 | Salaverry et al. | 345/173 |
| 8,674,956 B2* | 3/2014 | Sumi et al. | 345/173 |
| 8,686,964 B2* | 4/2014 | Rimon | 345/174 |
| 8,723,827 B2* | 5/2014 | Wright et al. | 345/173 |
| 8,766,911 B2* | 7/2014 | Waller et al. | 345/156 |
| 8,803,832 B2* | 8/2014 | Ohashi et al. | 345/173 |
| 2003/0214488 A1* | 11/2003 | Katoh | 345/173 |
| 2004/0178997 A1* | 9/2004 | Gillespie et al. | 345/173 |
| 2007/0285404 A1* | 12/2007 | Rimon et al. | 345/173 |
| 2008/0048997 A1 | 2/2008 | Gillespie et al. | |
| 2008/0259044 A1* | 10/2008 | Utsunomiya et al. | 345/173 |
| 2008/0309629 A1* | 12/2008 | Westerman et al. | 345/173 |
| 2009/0096758 A1* | 4/2009 | Hotelling et al. | 345/173 |
| 2009/0174679 A1* | 7/2009 | Westerman | 345/173 |
| 2010/0079413 A1* | 4/2010 | Kawashima et al. | 345/175 |
| 2010/0097329 A1* | 4/2010 | Simmons et al. | 345/173 |
| 2010/0107067 A1* | 4/2010 | Vaisanen | 715/702 |
| 2010/0188371 A1* | 7/2010 | Lowles et al. | 345/178 |
| 2010/0289754 A1* | 11/2010 | Sleeman et al. | 345/173 |

FOREIGN PATENT DOCUMENTS

| | | |
|---|---|---|
| JP | 10-020992 | 1/1998 |
| JP | 2003-511799 | 3/2003 |
| JP | 2008-269297 | 11/2008 |
| KR | 2007-0011450 | 1/2007 |
| WO | WO 2005/114369 | 12/2005 |

OTHER PUBLICATIONS

Extended European Search Report in EP 10003950, dated Oct. 9, 2013 and annex to the European Search Report (4 pgs.).

* cited by examiner

TOUCH-PANEL DEVICE

CROSS-REFERENCE TO RELATED APPLICATION

The present application claims priority from Japanese applications JP 2009-098235 filed on Apr. 14, 2009 and JP 2009-196958 filed on Aug. 27, 2009, the contents of which are hereby incorporated by reference into these applications.

BACKGROUND OF THE INVENTION

1. Field of the Invention

The present invention relates to a touch-panel device, and more particularly, to a technology of detecting a touched position in a projected capacitive type touch-panel device.

2. Description of the Related Art

A touch-panel device (also called touch screen) is a user interface device which includes an input device called touch pad and an output device formed of, for example, a flat panel display, in which the input device and the output device are integrally formed. The touch-panel device has a feature of an intuitive operation method in which an operation target displayed on a display is directly touched with a finger or the like, and is widely used for an information terminal device or the like.

There are various methods of implementing the touch-panel device, and one of those methods includes a projected capacitive type system. According to the projected capacitive type system, a plurality of electrodes are arranged on the touch panel, and a touched position is detected based on a change in electrostatic capacitance of the electrodes caused when a fingertip approaches the touch panel. The electrodes are formed of a material with high transmittance and arranged on the display panel, to thereby form a touch-panel device.

Accuracy of touched position detection may be referred to as a performance index of a touch panel as an input device. When an error between a position on the display panel actually touched by a user and a detected position is smaller, the accuracy is higher.

JP 2003-511799 A (hereinafter, referred to as Patent Document 1) discloses a method as an example of a technology of detecting a touched position with high accuracy in a projected capacitive type touch-panel device. According to the touched position detecting method, electrodes for detecting positions in an X direction and a Y direction are arranged in a pattern so as to allow a fingertip to touch a plurality of electrodes simultaneously when touching the display panel, to thereby determine the touched position with high accuracy.

Alternatively, JP 2008-269297 A (hereinafter, referred to as Patent Document 2) employs an electrode pattern in which electrodes for detecting positions in an X direction and a Y direction are formed on a single layer, to thereby reduce the manufacturing process.

SUMMARY OF THE INVENTION

However, the conventional touched position detecting method involves a problem that, in a case where a range (touched area) on the touch panel touched by a fingertip extends off an area (electrode area) where the electrodes are arranged, accuracy of touched position detection is reduced. In order to prevent such reduction in accuracy, an effective range for detecting a touched position needs to be limited to a certain range within the electrode area. Accordingly, even if the electrodes are arranged across the entire touch panel, a touched position falling on an area at the edge of the touch panel still may not be detected.

The present invention has been made in order to solve the above-mentioned problems, and therefore, it is an object of the present invention to provide a touch-panel device capable of detecting a touched position with high accuracy even when a touched area extends off an electrode area, to thereby form the entire electrode area as an effective range for detecting the touched position.

The present invention provides two kinds of solving means as follows.

According to first solving means, the touched area is assumed to be, for example, a circular in shape. A width in an X direction and a width in a Y direction of an area where the touched area in a circular shape and the electrode area overlap each other may be determined based on sensor measured values. When the width in the X direction and the width in the Y direction are different from each other, it is judged that the touched area extends off the electrode area, and a position of a center of the touched area in the circular shape is calculated as the touched position.

According to second solving means, in a case where a signal value of an electrode provided on the edge of the touch panel becomes largest, it is judged whether or not a periphery of the touch panel is touched. In a case where the periphery of the touch panel is touched, a weighted average is calculated in the touched position calculation process based on an electrode position parameter value which is different from the value employed in a case where the center of the touch panel is touched. A signal value of each of the electrodes is assigned a weight and the weight is varied in accordance with a touch size, to thereby correct a calculated position.

It should be noted that JP 10-020992 A (hereinafter, referred to as Patent Document 3) also discloses a method of detecting a touched position with high accuracy in a state where an electrode provided on the edge of the touch panel takes a largest signal value. However, in the method according to Patent Document 3, an electrode position adjacent to the electrode provided on the edge portion and an electrode position at anothe-r edge portion are selected, to thereby detect a touched position by using an approximate quadratic curve. Accordingly, this method is completely different from the method according to the present invention.

According to the first solving means, a touched position may be detected with high accuracy even in a case where the touched area extends off the electrode area in one of the X direction and the Y direction.

According to the second solving means, a touched position may be detected with high accuracy by using an electrode for detecting a touched position in one direction, even in a case where the periphery of the touch panel is touched.

DETAILED DESCRIPTION OF THE INVENTION

In the following, exemplary embodiments of the present invention are described.

[First Embodiment]

Figure 1:
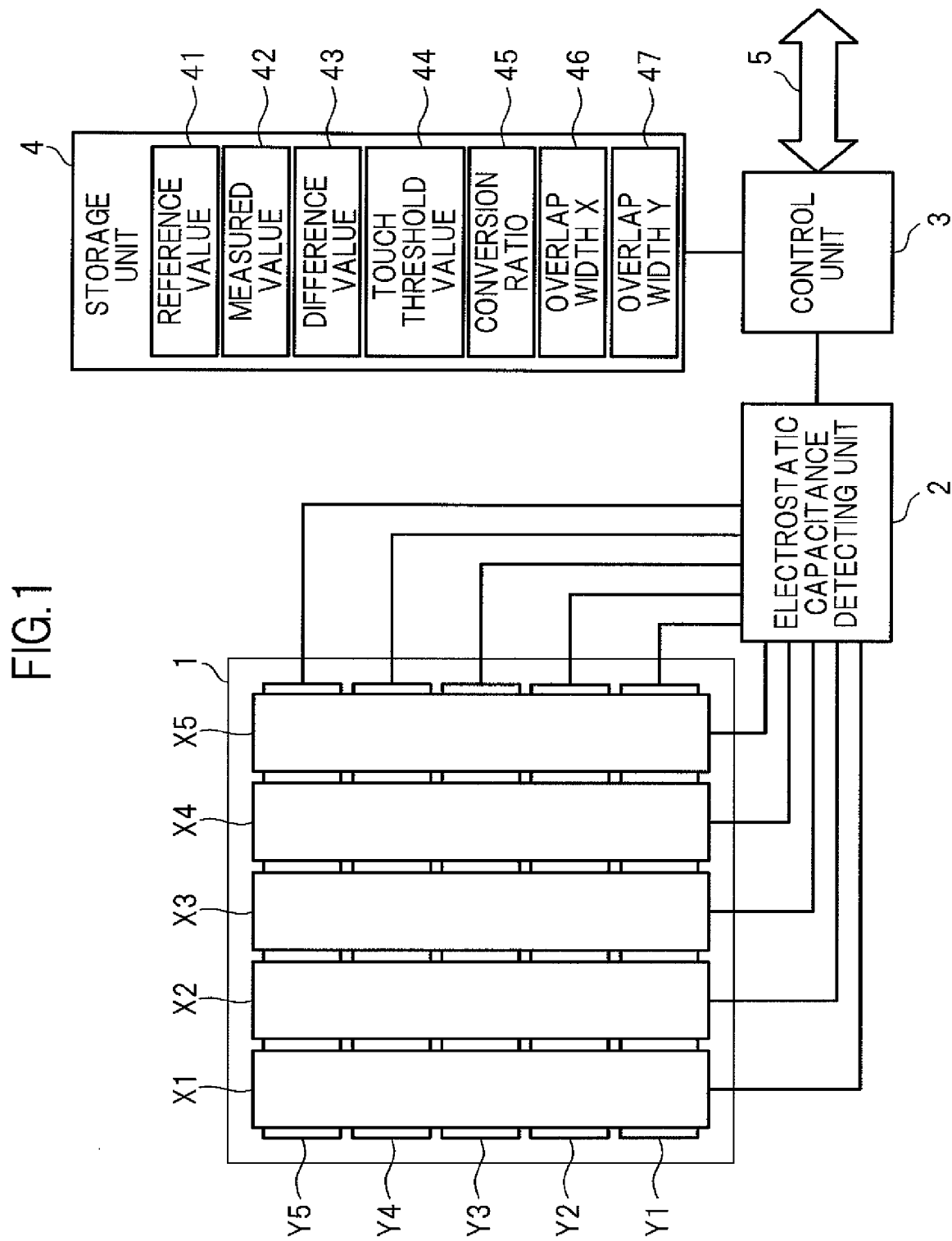
FIG. 1 is a block diagram illustrating an entire configuration of a touch panel module according to a first embodiment of the present invention.

FIG. 1 is a block diagram illustrating an entire configuration of a touch panel module (touch-panel device) employed in a first embodiment of the present invention. The touch panel module includes a touch panel 1, an electrostatic capacitance detecting unit 2, a control unit 3, a storage unit 4, and a bus connection signal line 5. In the touch panel 1, electrodes X1 to X5 and electrodes Y1 to Y5 serving as sensor terminals for detecting a touch by a user are formed in an electrode pattern. The electrostatic capacitance detecting unit 2 is connected to the electrodes X1 to X5 and the electrodes Y1 to Y5, and measures electrostatic capacitance in each of the electrodes. The control unit 3 detects a touched position, based on the measured electrostatic capacitance, and notifies a host of the detection result via the bus connection signal line 5. The storage unit 4 stores the following values as parameters and working data necessary in a touched position detection process to be performed by the control unit 3. The parameters include a reference value 41, a measured value 42, and a difference value 43, which are sequence data with an element count corresponding to a total count of the electrodes. In the first embodiment, the element count of the sequence is 10. A touch threshold value 44, a conversion ratio 45, an overlap width X46, and an overlap width Y47 each are single numeric value data.

Figure 2:
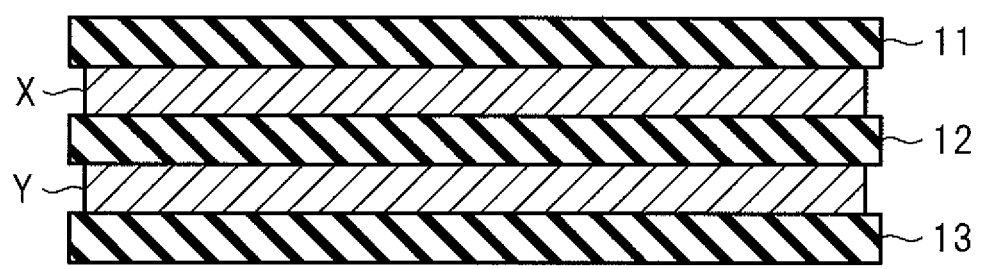
FIG. 2 is a cross-sectional view illustrating a cross-sectional structure of a touch panel.

FIG. 2 is a cross-sectional view illustrating a cross-sectional structure of the touch panel 1. In the touch panel 1, an electrode layer Y, an insulating layer 12, an electrode layer X, and a protective layer 11 are laminated in the stated order on a substrate layer 13.

Figure 3:
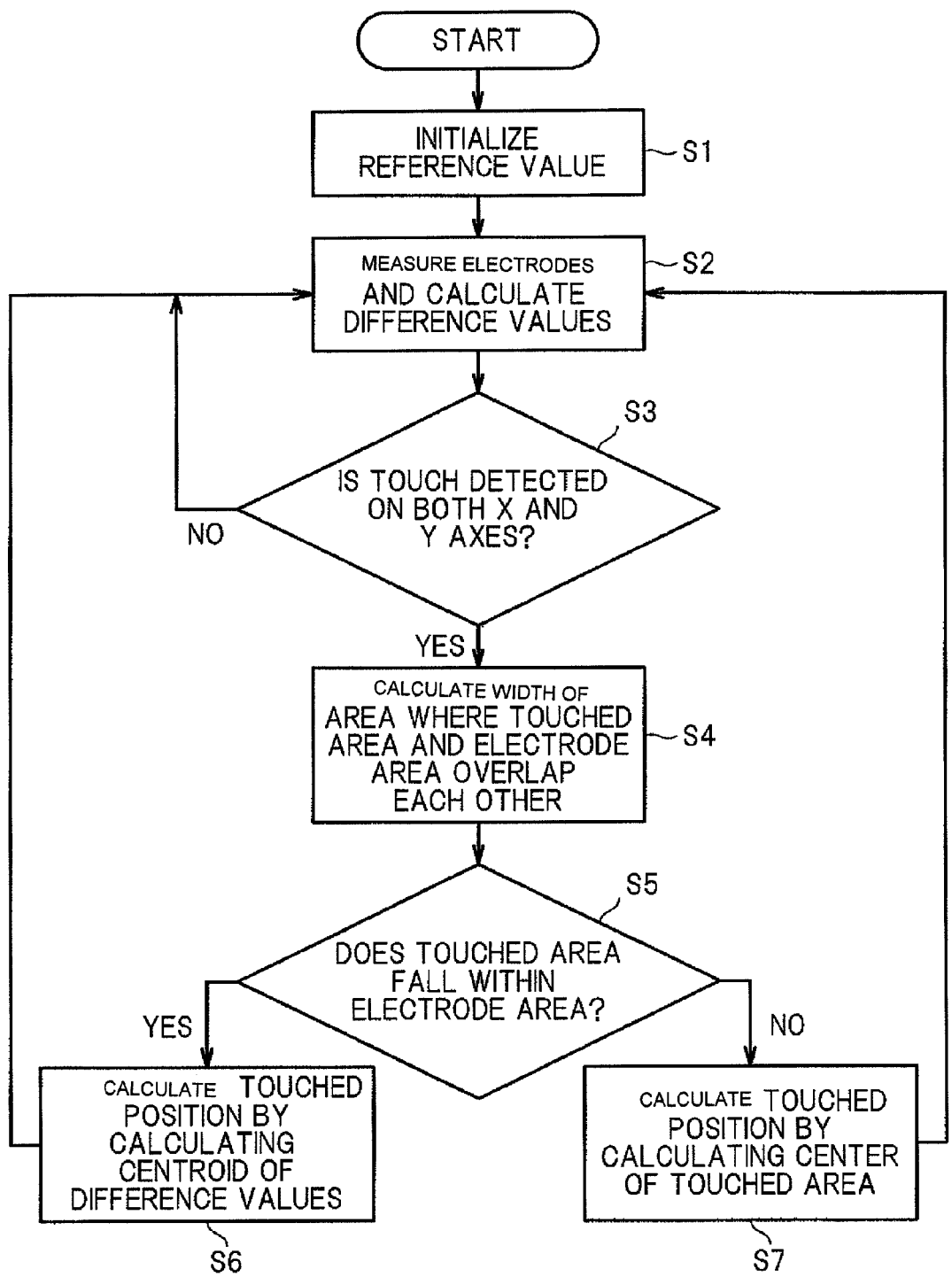
FIG. 3 is a flow chart illustrating a procedure of a touched position detection process.

FIG. 3 is a flow chart illustrating a procedure of the touched position detection process.

Figure 4:
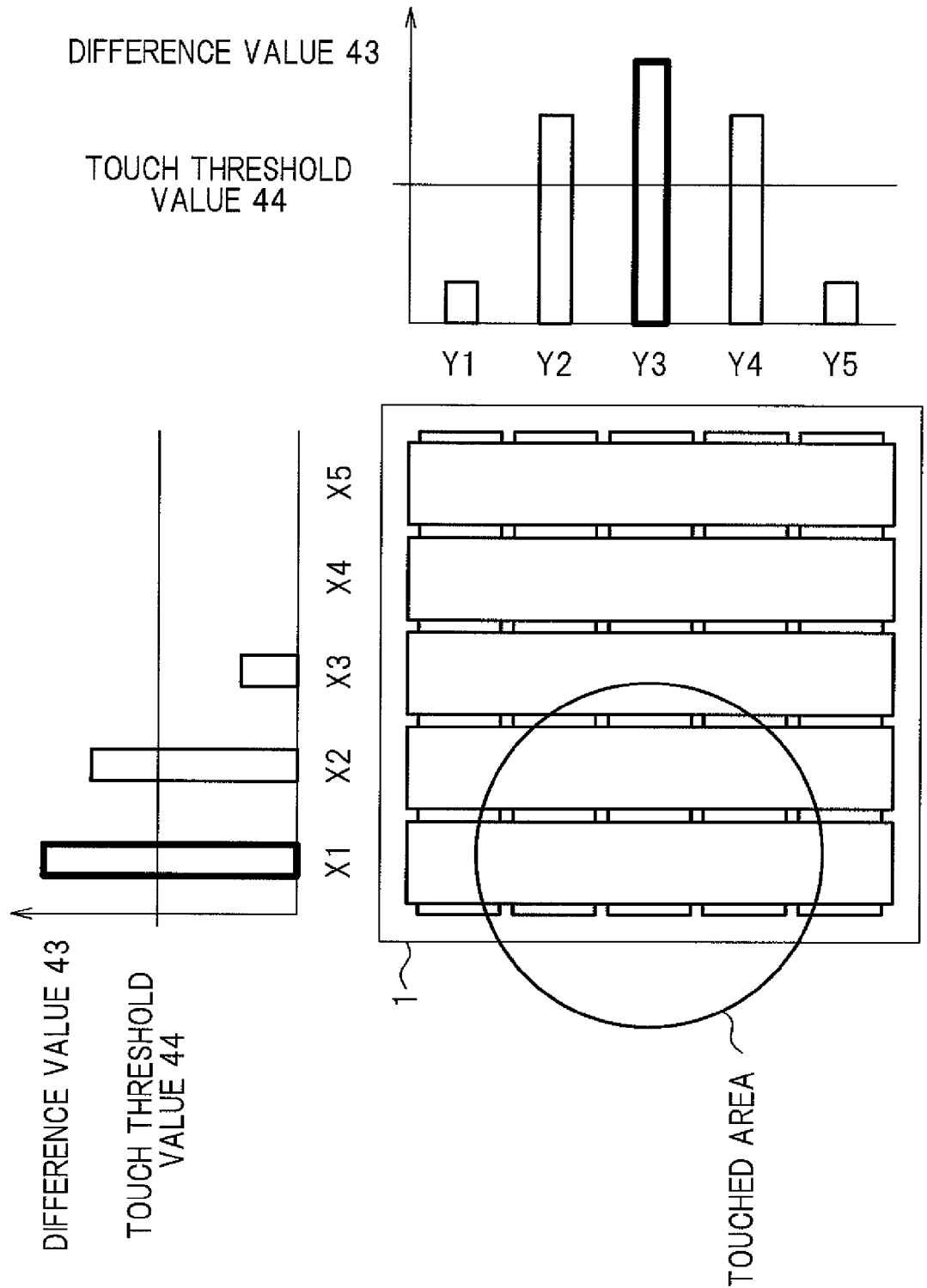
FIG. 4 is a diagram illustrating examples of sensor measured values in a case where a touched area extends off an electrode area.

FIG. 4 is a diagram illustrating examples of sensor measured values in a case where a touched area extends off an electrode area.

Figure 5:
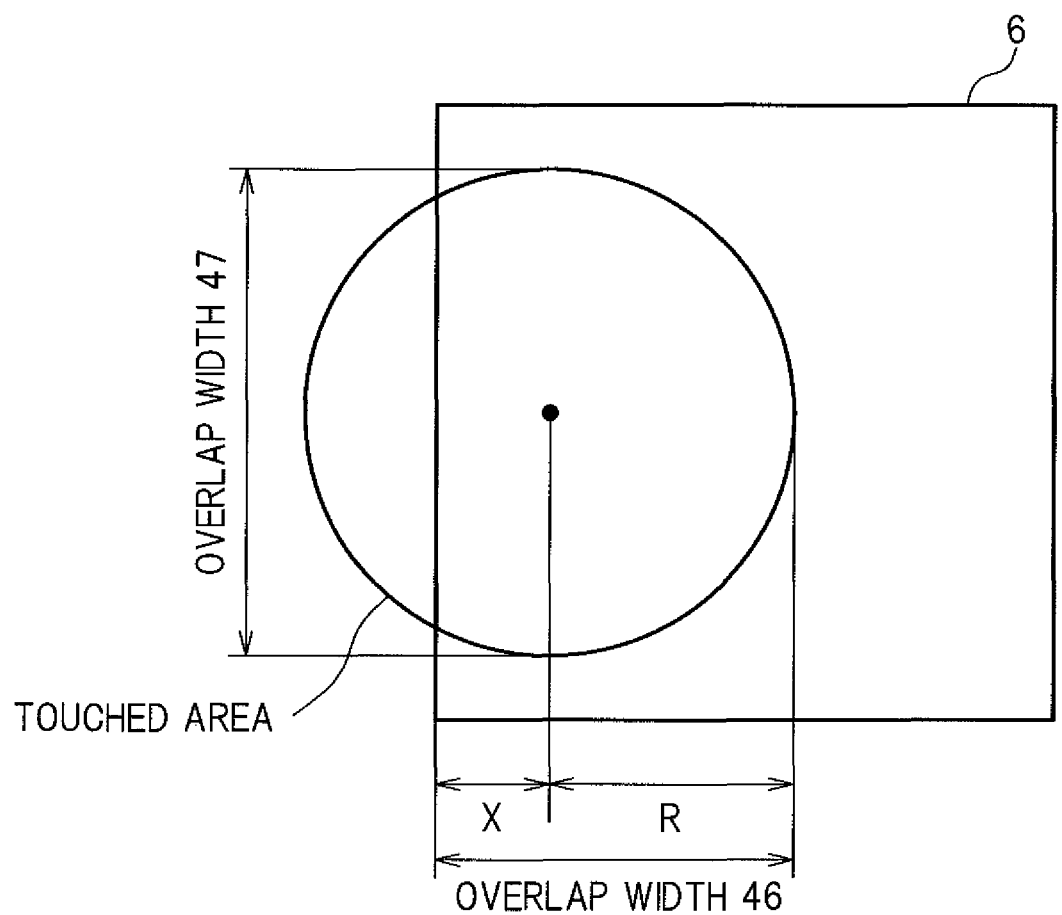
FIG. 5 is a diagram illustrating how to calculate a touched position in the case where the touched area extends off the electrode area.

FIG. 5 is a diagram illustrating how to calculate a touched position in a case where the touched area extends off the electrode area.

In the following, with reference to the flow chart of FIG. 3, a processing flow of detecting a touched position is described.

The following process is started when the touch panel module is turned on.

In Step S1, the control unit 3 initializes the reference value 41. Specifically, the control unit 3 measures electrostatic capacitance in each of all the electrodes (electrodes X1 to X5 and electrodes Y1 to Y5), and stores the value thus determined as the reference value 41 of each of the electrodes. The reference value 41 corresponds to electrostatic capacitance determined for each of the electrodes when the touch panel 1 is not touched. It is assumed here that the touch panel 1 is not touched when the touch panel module is turned on.

In Step S2, the control unit 3 first measures electrostatic capacitance for each of all the electrodes, and stores the value thus determined as the measured value 42 for each of the electrodes. Further, the control unit 3 stores a value determined by the expression (1) below as the difference value 43.

Difference value 43=Measured value 42−Reference value 41    (1)

It should be noted that in a case where a value determined by the expression (1) is negative, 0 is stored instead of the determined value, as the difference value 43. The difference value 43 corresponds to electrostatic capacitance increased in each of the electrodes due to the touch on the touch panel 1.

In the following, a description is given on the assumption that the difference values 43 are determined as illustrated in FIG. 4. In FIG. 4, a graph on the upper side of the touch panel 1 illustrates examples of the difference value 43 and the touch threshold value 44 determined for each of the electrodes X1 to X5. The electrodes X1 to X5 are plotted along the horizontal axis, and the height of the bar graph corresponds to the difference value 43. The difference values 43 of the electrodes X1 and X2 are equal to or larger than the touch threshold value 44, while the difference values 43 of the electrodes X3 to X5 are smaller than the touch threshold value 44. In FIG. 4, a graph on the right side of the touch panel 1 illustrates examples of the difference value 43 and the touch threshold value 44 determined for each of the electrodes Y1 to Y5. The electrodes Y1 to Y5 are plotted along the horizontal axis, and the height of the bar graph corresponds to the difference value 43. The difference values 43 of the electrodes Y2 to Y4 are equal to or larger than the touch threshold value 44, while the difference values 43 of the electrodes Y1 and Y5 are smaller than the touch threshold value 44.

In Step S3, the control unit 3 judges whether or not the touch panel 1 is touched. Specifically, the control unit 3 compares, for each of all the electrodes, the difference value 43 with the touch threshold value 44 set in advance. In this case, when both the X and Y axes include at least one electrode which has the difference value 43 equal to or larger than the touch threshold value 44, the control unit 3 judges that the touch panel 1 is touched, and proceeds to Step S4. When the above-mentioned condition is not satisfied, the control unit 3 judges that the touch panel 1 is not touched, and returns to Step S2. In the case illustrated in FIG. 4, the difference values 43 of the electrodes X1 and X2 and the electrodes Y2 to Y4 are equal to or larger than the touch threshold value 44, and therefore it is judged that the touch panel 1 is touched.

In Step S4, the control unit 3 stores values determined by the expressions (2) and (3) below as the overlap width X46 and the overlap width Y47, respectively.

Overlap width X46=MAX (Difference value 43 of Y axis)*Conversion ratio 45    (2)

Overlap width Y47=MAX (Difference value 43 of X axis)*Conversion ratio 45    (3)

Here, the function MAX returns a largest value selected from a plurality of values. In FIG. 4, the difference value 43 of the electrode X1 is largest on the X axis while the difference value 43 of the electrode Y3 is largest on the Y axis. The conversion ratio 45 is a preset value, so as to convert the difference value 43 into a length on the touch panel 1. The overlap width X46 and the overlap width Y47 correspond to, as illustrated in FIG. 5, the widths in the X direction and in the Y direction, respectively, of an area where an area touched (touched area) and an area where electrodes are arranged (electrode area 6) overlap each other on the touch panel 1.

The reason why the overlap width X46 may be determined by the expression (2) is as follows. As is understood from FIG. 4, the electrode Y3 overlaps the touched area with a largest width in the X direction, and hence a change in electrostatic capacitance is largest, with the result that the difference value 43 of the electrode Y3 becomes largest as illustrated in the graph on the right side. The electrodes Y2 and Y4 overlap the touched area with a width in the X direction smaller than that of the electrode Y3, and hence a change in electrostatic capacitance is smaller than that of the electrode Y3, with the result that the difference values 43 of the electrodes Y2 and Y4 are smaller than the difference value 43 of the electrode Y3 as illustrated in the graph on the right side. The electrodes Y1 and Y5 overlap the touched area with only a slight width in the X direction, and hence a change in electrostatic capacitance is very small, with the result that the difference values 43 of the electrodes Y1 and Y5 are very small as illustrated in the graph on the right side. The overlap width X46 corresponds to a width in the X direction of the area where the touched area and the electrode area 6 overlap each other, and hence the overlap width X46 is proportional to the width in the X direction with which the electrode Y3 overlaps the touched area, the electrode Y3 overlapping the touched area with a largest width in the X direction. Accordingly, the overlap width X46 is proportional to the difference value 43 of the electrode Y3. Therefore, the overlap width X46 may be determined by the expression (2). The conversion ratio 45 may be determined from experiment or the like.

The reason why the overlap width Y47 may be determined by the expression (3) is as follows. As is understood from FIG. 4, the electrode X1 overlaps the touched area with a largest width in the Y direction, and hence a change in electrostatic capacitance is largest, with the result that the difference value 43 of the electrode X1 becomes largest as illustrated in the graph on the upper side. The electrode X2 overlaps the touched area with a width in the Y direction smaller than that of the electrode X1, and hence a change in electrostatic capacitance is smaller than that of the electrode X1, with the result that the difference value 43 of the electrode X2 is smaller than the difference value 43 of the electrode X1 as illustrated in the graph on the upper side. The electrode X3 overlaps the touched area with only a slight width in the Y direction, and hence a change in electrostatic capacitance is very small, with the result that the difference value 43 of the electrode X3 is very small as illustrated in the graph on the upper side. The electrodes X4 and X5 do not overlap the touched area with a width in the Y direction, and hence no change in electrostatic capacitance is caused, with the result that the difference values 43 of the electrodes X4 and X5 are 0 as illustrated in the graph on the upper side. The overlap width Y47 corresponds to a width in the Y direction of the area where the touched area and the electrode area 6 overlap each other, and hence the overlap width Y47 is proportional to the width in the Y direction with which the electrode X1 overlaps the touched area, the electrode X1 overlapping the touched area with a largest width in the Y direction. Accordingly, the overlap width Y47 is proportional to the difference value 43 of the electrode X1. Therefore, the overlap width Y47 may be determined by the expression (3). The conversion ratio 45 may be determined from experiment or the like.

In Step S5, the control unit 3 compares the values of the overlap width X46 and the overlap width Y47 with each other. When the difference between the values is smaller than a predetermined threshold value, the control unit 3 judges that the entire touched area falls within the electrode area 6, and proceeds to Step S6. Otherwise, the control unit 3 proceeds to Step S7.

In Step S6, the control unit 3 determines a touched position based on the difference value 43. Specifically, the control unit 3 determines, for each of the X axis and the Y axis, a weighted average assuming that the difference value 43 of each of the electrodes is a weight wi and the positions of the electrodes are xi and yi. In other words, the control unit 3 performs calculations of the expressions (4) and (5) below.

$$\text{Touched position } (X \text{ coordinate}) = \Sigma(wi*xi)/\Sigma(wi) \quad (4)$$

$$\text{Touched position } (Y \text{ coordinate}) = \Sigma(wi*yi)/\Sigma(wi) \quad (5)$$

In the manner as described above, one cycle of the touched position detection process performed in the case where the touched area does not extend off the electrode area 6 is completed, and the control unit 3 returns to Step S2.

In Step S7, the control unit 3 assumes that the touched area is circular in shape, and calculates the center position of the circle as the touched position. Here, as illustrated in FIG. 5, it is assumed that the touched area extends off the electrode area 6 in the X direction. In this case, the X coordinate of the touched position is determined by the expression (6) below.

$$\text{Touched position } (X \text{ coordinate}) = \text{Overlap width } X\mathbf{46} - \text{Overlap width } Y\mathbf{47}/2 \quad (6)$$

In FIG. 5, X and R correspond to the X coordinate and the overlap width Y47/2, respectively. The Y coordinate may be determined by the expression (5) which is adopted in the case where the touched area does not extend off the electrode area 6. Alternatively, in a case where the touched area extends off the electrode area 6 in the Y direction, X and Y may be replaced with each other in the calculation method described above, so as to determine the touched position similarly.

In the manner as described above, one cycle of the touched position detection process performed in the case where the touched area extends off the electrode area 6 is completed, and the control unit 3 returns to Step S2.

In the above description, it is assumed that the touched area is circular in shape. However, the first embodiment may be applied to any other case as long as the touched position may be calculated based on the overlap width X46 and the overlap width Y47. That is, a width in the X direction and a width in the Y direction of an area where the touched area and the electrode area overlap each other may be determined, and a position of the center of the touched area may be determined based on the width in the X direction and the width in the Y direction thus determined, to thereby calculate the position of the center thus determined as the touched position. The touched area may be assumed to be in an arbitrary shape. For example, the touched area may be assumed to be circular or oval in shape. Alternatively, the touched area may be assumed to be in a shape which has a constant ratio of a width thereof in the X direction to a width thereof in the Y direction (for example, in a square or rectangular shape, or in a square or rectangular shape having rounded corners). Still alternatively, the touched area may be in a shape determined from experiment or the like.

[Second Embodiment]

Next, a second embodiment of the present invention is described. In the following, constituent elements that have been already described in the first embodiment are denoted by the same reference symbols, and the description thereof is omitted.

Figure 6:
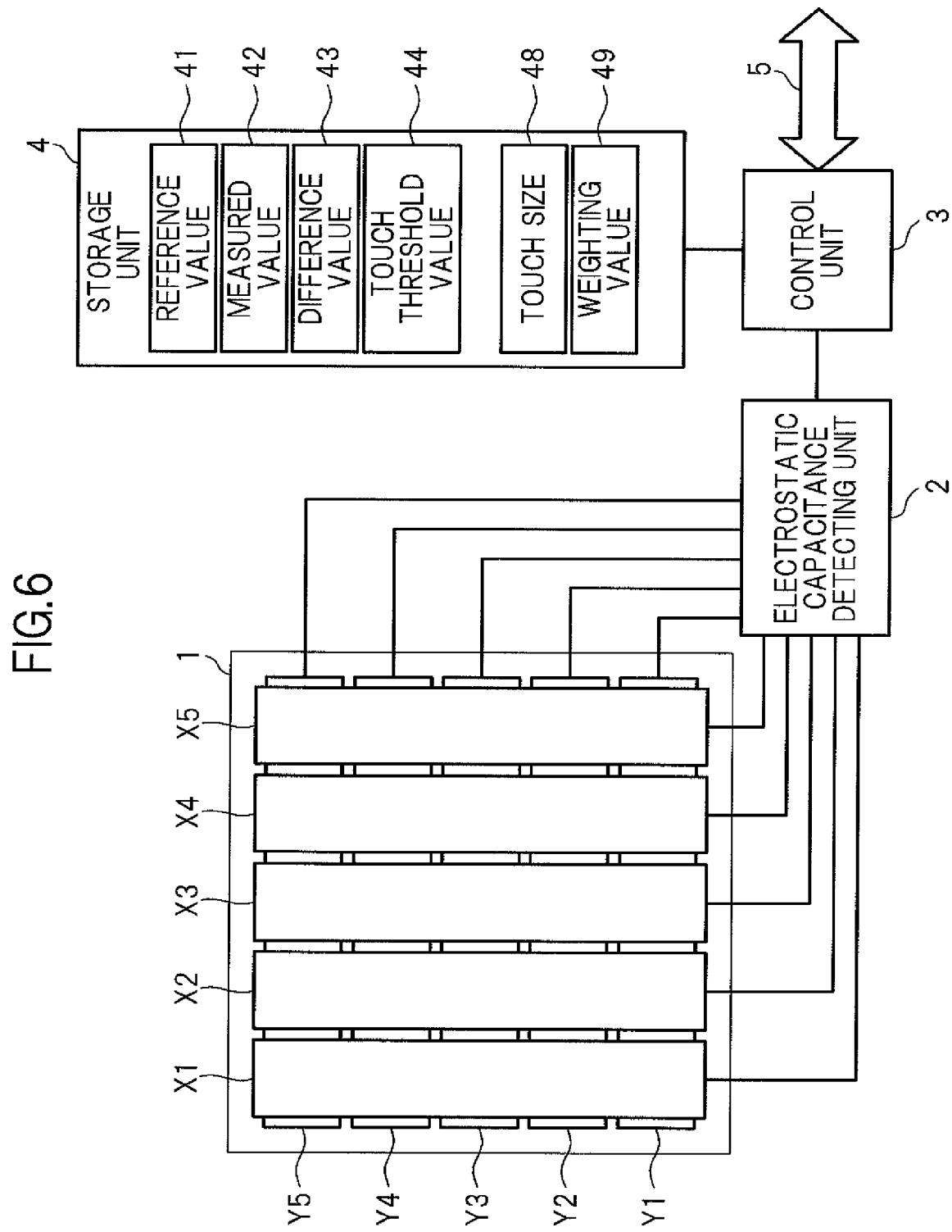
FIG. 6 is a block diagram illustrating an entire configuration of a touch panel module according to a second embodiment of the present invention.

FIG. 6 is a block diagram illustrating an entire configuration of a touch panel module according to the second embodiment. Unlike the storage unit 4 of the first embodiment, the storage unit 4 of the second embodiment stores a touch size 48 and a weighting value 49, in addition to the reference value 41, the measured value 42, the difference value 43, and the touch threshold value 44 described above. The touch size 48 is a single numerical data. The weighting value 49 is a single or a plurality of numerical data.

Figure 7:
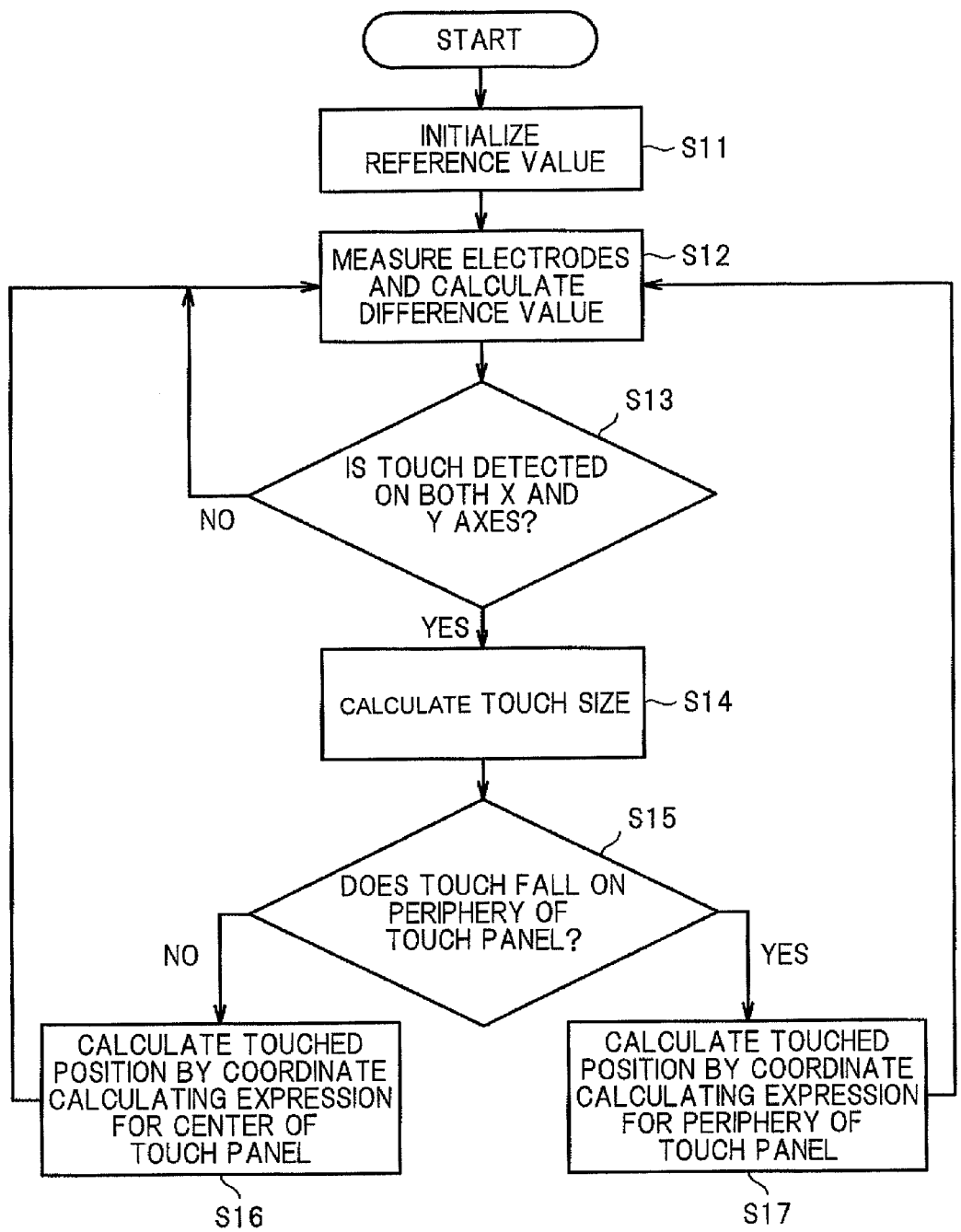
FIG. 7 is a flow chart illustrating another procedure of the touched position detection process.

FIG. 7 is a flow chart illustrating a procedure of a touched position detection process.

Figure 8:
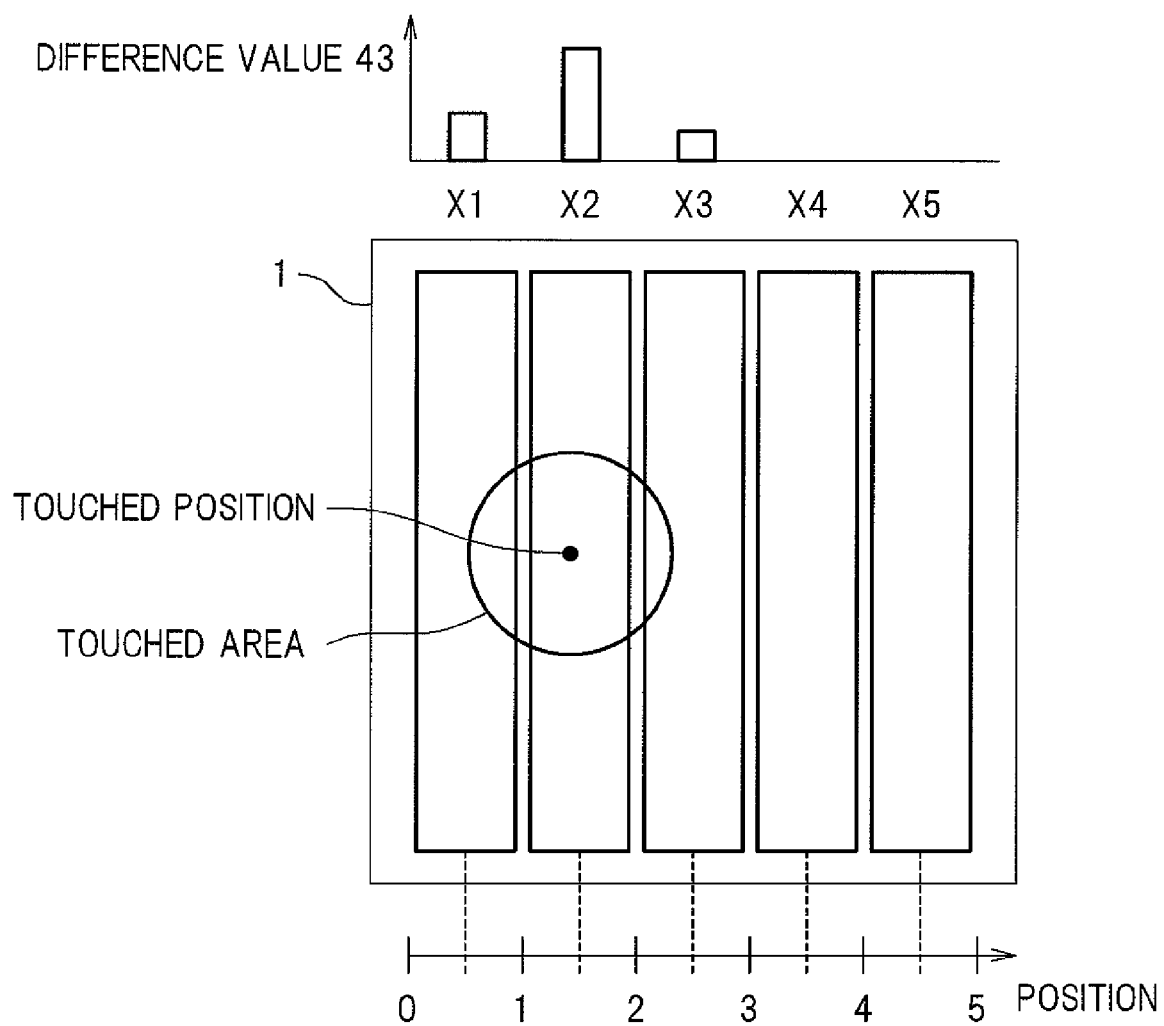
FIG. 8 is a diagram illustrating a case where a touched position falls on a center of the touch panel.

FIG. 8 is a diagram illustrating a case where a touched position falls on a center of the touch panel.

Figure 9:
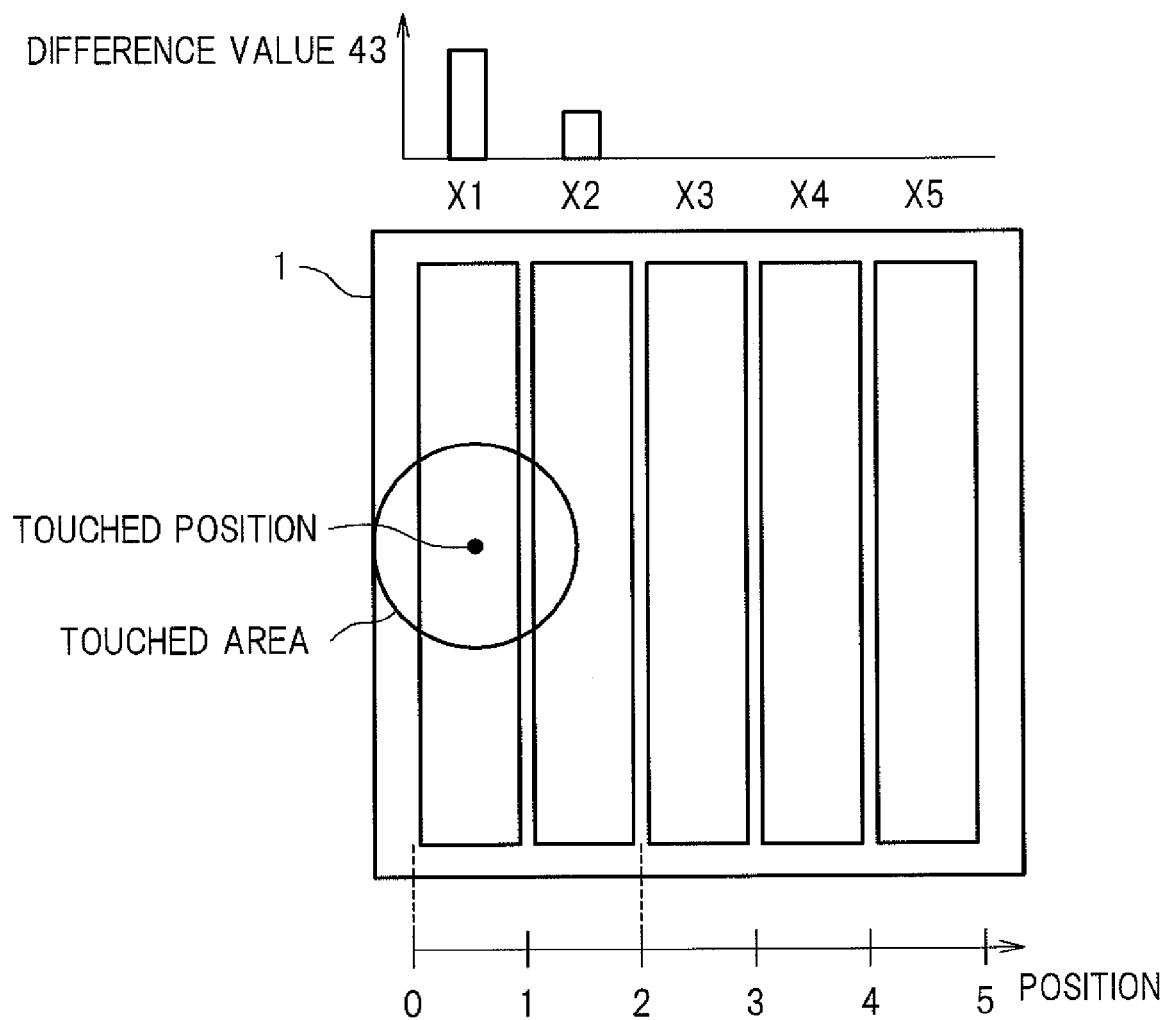
FIG. 9 is a diagram illustrating a case where a touched position falls on a periphery of the touch panel.

FIG. 9 is a diagram illustrating a case where a touched position falls on a periphery of the touch panel.

In the following, with reference to the flow chart of FIG. 7, a processing flow of detecting a touched position is described. The following process is started when the touch panel module is turned on.

The processing in Steps S11 to S13 is similarly performed as in Steps S1 to S3 of the first embodiment, and therefore the description thereof is omitted.

In Step S14, the control unit 3 determines a total of the difference values 43 of all the electrodes, that is, the electrodes X1 to X5 and the electrodes Y1 to Y5, and stores the determined value as the touch size 48. The touch size 48 assumes a value proportional to the size of the touched area, and is notified to the host as an index indicating a strength of the touch, together with the touched position to be detected in the following steps. The reason why the touch size (value proportional to the size of the touched area) is determined based on the total of the difference values 43 of all the electrodes is as follows. For example, in FIG. 8, the difference value 43 of the electrode X1 is proportional to the size of the area where the electrode X1 and the touched area overlap each other, the difference value 43 of the electrode X2 is proportional to the size of the area where the electrode X2 and the touched area overlap each other, the difference value 43 of the electrode X3 is proportional to the size of the area where the electrode X3 and the touched area overlap each other, the difference value 43 of the electrode X4 is proportional to the size of the area where the electrode X4 and the touched area overlap each other, and the difference value 43 of the electrode X5 is proportional to the size of the area where the electrode X5 and the touched area overlap each other. The same applies to the electrodes Y1 to Y5. Accordingly, the difference values of all the electrodes may be summed, to thereby determine the touch size (value corresponding to the size of the touched area). In the second embodiment, the touch size is determined in the manner as described above. However, the touch size may be determined by any other method.

In the following, a procedure of detecting a touched position in the X direction is described. A touched position in the Y direction may also be determined by a similar procedure.

In Step S15, the control unit 3 judges whether or not the detected touch falls on a periphery of the touch panel 1. Specifically, when any of the electrodes provided on the edge of the touch panel 1, that is, the electrode X1 or X5 has the difference value 43 which is largest, the control unit 3 judges that the touch falls on the periphery of the touch panel 1, and proceeds to Step S17. In a case where the above-mentioned condition is not satisfied, the control unit 3 judges that the touch does not fall on the periphery of the touch panel 1 (the touch falls on the center of the touch panel), and proceeds to Step S16. For example, in a state as illustrated in FIG. 8, the electrode X2, which is not provided on the edge of the touch panel 1, has the difference value 43 which is largest, and hence it is judged that the touch does not fall on the periphery of the touchpanel 1. In a state as illustrated in FIG. 9, the electrode X1, which is provided on the edge of the touch panel 1, has the difference value 43 which is largest, and hence it is judged that the touch falls on the periphery of the touch panel 1.

In Step S16, the control unit 3 determines, as a coordinate calculation process performed for a touch falling on the center of the touch panel 1, the touched position based on the difference value 43 of each of the electrodes. Specifically, the control unit 3 determines a weighted average assuming that the difference value 43 of each of the electrodes is a weight wi and the position of each of the electrodes is xi. In other words, the control unit 3 performs a calculation of the expression (7) below.

$$\text{Touched position} = \Sigma(wi*xi)/\Sigma(wi) \quad (7)$$

Here, the electrode position xi corresponds to a coordinate value of the center of each of the electrodes. In the state as illustrated in FIG. 8, the electrodes X1 to X5 respectively have the electrode positions xi of 0.5, 1.5, 2.5, 3.5, and 4.5 in the stated order. In the manner as described above, one cycle of the touched position detection process is completed, and the control unit 3 returns to Step S12.

In Step S17, the control unit 3 determines, as a coordinate calculation process performed for a touch falling on the periphery of the touch panel 1, the touched position based on the largest difference value 43 of an electrode and the difference value 43 of another electrode next to the electrode (two electrodes provided on the edge of the touch panel 1). Specifically, the control unit 3 performs the calculation of the expression (7), as in Step S16, based on the two electrodes provided on the edge of the touch panel 1. The calculation performed in Step S17 is different from Step S16 in that the electrode positions xi, that is, parameter values of a sensor position, are defined as coordinate values of the outer edges of the two electrodes. In the state as illustrated in FIG. 9, the position of the electrode X1 is defined as 0, and the position of the electrode X2 is defined as 2. The expression (8) below is calculated in this case, which is determined by substituting 0 and 2 into the electrode positions x1 and x2 for the two electrodes provided on the edge of the touch panel 1 in the expression (7).

$$\text{Touched position} = 2*w2/(w1+w2) \quad (8)$$

In the expression (8), the coordinate values (x1=0 and x2=2) of the outer edges of two electrodes are selected as the electrode positions so that the touched position may be calculated as 0 (edge of the touch panel 1) when the difference value 43 is measured only for the electrode X1 while the touched position may be calculated as 1 (midpoint between the electrode X1 and the electrode X2) when the difference values 43 of the electrode X1 and the electrode X2 are equal to each other, that is, w1=w2. For example, in FIG. 9, when the difference value w1 of the electrode X1 is 1 and the difference value w2 of the electrode X2 is 0.4, the touched position is calculated as 0.57 by using the expression (8) when x1=0 and x2=2 according to the second embodiment. On the other hand, the touched position is calculated as 0.79 by using the expression (7) which is based on the position coordinates of the centers of two electrodes provided on the edge of the touch panel 1 (x1=0.5 and x2=1.5). As is apparent from FIG. 9, the actual touched position is closer to the touched position of 0.57 calculated according to the second embodiment than to the touched position of 0.79 calculated based on the position coordinates of the centers of the electrodes.

In the manner as described above, one cycle of the touched position detection process is completed, and the control unit 3 returns to Step S12.

As described above, in Step S15, it is judged that the touch falls on the periphery of the touch panel 1 under the condition that the difference value 43 of an electrode provided on the edge of the touch panel 1 is largest. However, another condition may also be employed. For example, the judgment may be made under a condition that a total of the difference values 43 of an electrode provided on the edge of the touch panel 1 and of a predetermined number of electrodes adjacent to the electrode is larger than a total of the difference values 43 of the rest of the electrodes.

As described above, in Step S17, two electrodes provided on the edge of the touch panel 1 are referred to. However, it is also conceivable to adopt a method in which three or more electrodes are referred to. Further, the electrode positions xi are defined as outer edges of two electrodes when calculating a weighted average. However, the electrode positions xi may be defined differently. The number of electrodes to be referred to and the electrode position xi may be determined depending on the matters of design, such as an assumed size of the touched area or an assumed width of the electrodes.

In the above, the second embodiment of the present invention has been specifically described. It should be noted that the touch-panel device according to the second embodiment has a feature in that the parameter values (x1 and x2 in the embodiment described above) for the sensor position to be used in the coordinate calculation process when the touch falls on the periphery of the touch panel 1 is different from those employed when the touch falls on the center of the touch panel 1.

[Third Embodiment]

Next, a third embodiment of the present invention is described. In the third embodiment, the expression for calculating coordinates in Step S17 of the second embodiment is modified.

In the third embodiment, in the case where the touch falls on the periphery of the touch panel 1, each of the electrodes, which is referred to when calculating coordinates, is assigned a weight in order to reduce a deviation (error) of the calculated touched position from the actual touched position. There may be various methods of assigning weights to the electrodes. As one example, there may be employed a method in which, in the expression (7), the difference value 43 (wi) of each of the electrodes may be multiplied by a predetermined weighting coefficient ai, which is expressed by the expression (9) below.

$$\text{Touched position} = \Sigma(ai*wi*xi)/\Sigma(ai*wi) \tag{9}$$

In the expression (9), similarly to the second embodiment, the electrode positions xi of the two electrodes provided on the edge of the touch panel 1 are defined by coordinate values of the outer edges of the two electrodes, that is, x1=0 and x2=2, which is expressed by the expression (10) below.

$$\text{Touched position} = 2*a2*w2/(a1*w1+a2*w2) \tag{10}$$

The values of a1 and a2 are predetermined, and stored as the weighting value 49. The values of a1 and a2 may be determined from experiment or the like.

As another example, there may be employed a method in which the difference value 43 (w2) of the electrode X2 is assigned a weight based on the expression (8) so as to calculate the expression (11) below.

$$\text{Touched position} = (1+a)*w2/(w1+a*w2) \tag{11}$$

Here, the value a is predetermined, and stored as the weighting value 49. The coefficient in the numerator is defined as 1+a so that the touched position may be calculated as 1 (midpoint between the electrodes X1 and X2) when the difference values 43 of the electrodes X1 and X2 are equal to each other, that is, w1=w2. The value a (weighting value 49) may be determined from experiment or the like.

[Fourth Embodiment]

Next, a fourth embodiment of the present invention is described. In the fourth embodiment, the third embodiment is modified.

In the third embodiment, each of the electrodes is assigned a weight based on a preset constant. However, an appropriate amount of the weight may not be fixed, and may vary depending on the strength of the touch. In the fourth embodiment, a variable is employed as the weighting value, which is varied in accordance with the touch size 48. There may be various methods to change the weighting value. For example, in the expression (11), the weighting value 49 may be changed in accordance with the touch size 48. A predetermined function may be used to determine the weighting value 49. When the function is a linear function of the touch size 48, the expression (12) below may be determined.

$$\text{Weighting value } 49 = b*\text{Touch size } 48 + c \tag{12}$$

Here, the values b and c are predetermined. The values b and c may be determined from experiment or the like.

In the embodiments described above, the left side of the touch panel 1 is illustrated by way of example. However, a touched position on the periphery on the right side, the upper side, or the lower side of the touch panel 1 may similarly be calculated with high accuracy.

In the first embodiment, the touched position is detected by using both electrodes in the X direction and the Y direction, and hence the touched position may be detected with high accuracy in the periphery of the touch panel 1 in one of the X direction and Y direction, that is, the periphery of the touch panel 1 which does not include the corners of the touch panel 1. On the other hand, in the second to fourth embodiments, the touched position is detected by using the electrodes in only one direction (one of the X direction and the Y direction), and hence the touched position may be detected with high accuracy in the periphery of the touch panel 1 which includes the corners.

It should be noted that the present invention is not limited to the embodiments described above, and may be subjected to various modifications without departing from the gist of the present invention.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A touch-panel device for detecting a touched position based on sensor measured values determined by a plurality of sensors coupled to electrodes serving as sensor terminals, the touch-panel device being configured to:

determine, based on the sensor measured values for detecting a touched position in an X direction and a touched position in a Y direction, a width in the X direction and a width in the Y direction of an overlap area where a touched area and an electrode area of the electrodes overlap each other; determine, based on the width in the X direction and the width in the Y direction of the overlap area, a position of a center of the touched area; and calculate the position of the center of the touched area as the touched position, wherein, in a case where the touched area that includes a portion that extends off the electrode area in a first direction and another portion that overlaps the electrode area in the first direction, such that the portion of the touched area that extends off the electrode area is not detected, the position of the center of the touched area in the first direction is determined by subtracting, from a largest width in the first direction of the area where the touched area and the electrode area overlap each other, one-half of a largest width in a second direction, which is perpendicular to the first direction, of the area where the touched area and the electrode area overlap each other, and the first direction is one of the X direction and the Y direction, and the second direction is the other one of the X direction and the Y direction, and wherein: the width in the X direction of the overlap area where the touched area and the electrode area overlap each other is determined by multiplying a largest value of the sensor measured values on a Y axis by a preset value; and the width in the Y direction of the overlap area where the touched area and the electrode area overlap each other is determined by multiplying a largest value of the sensor measured values on an X axis by a preset value.

2. A touch-panel device for detecting a touched position based on sensor measured values determined by a plurality of sensors coupled to electrodes serving as sensor terminals and on positions of the electrodes, the touch-panel device being configured to perform a coordinate calculation process for determining the touched position by using parameter values for the positions of the plurality of electrodes, wherein the parameter values employed to perform the coordinate calculation process in a case where a periphery of a touch panel is touched are different from parameter values employed to perform the coordinate calculation process when a center of the touch panel is touched, wherein, in a case where the periphery of the touch panel is touched, the touched position is determined based on electrostatic capacitance of one of the electrodes having a maximum electrostatic capacitance, which has increased due to the touch on the touch panel, of all the electrodes, and electrostatic capacitance, which has increased due to the touch on the touch panel, of another electrode next to said one electrode, wherein, in a case where the touched area includes a portion that extends off the electrode area and another portion that overlaps the electrode area, so that the portion of the touched area that extends off the electrode area is not detected, an overlap width of the touched area and the electrode area is determined based on electrostatic capacitance in an electrode having the largest electrostatic capacitance increased due to a touch among all of the electrodes, wherein the parameter values employed in a case where a periphery of the touch panel is touched are defined by coordinate values of both outer edges of an electrode having the largest electrostatic capacitance and an electrode adjacent to the electrode having the largest electrostatic capacitance, and the parameter values employed in a case where the center of the touch panel is touched are defined by a coordinate value of the center of all of the electrodes, and wherein, in a case where the portion that extends off the electrode area and said another portion that overlaps the electrode area extend off the electrode area in a first direction and overlap the electrode area in the first direction, the position of the center of the touched area in the first direction is determined by subtracting, from a largest width in the first direction of the area where the touched area and the electrode area overlap each other, one half of a largest width in a second direction, which is perpendicular to the first direction, of the area where the area where the touched area and the electrode area overlap each other, and wherein the first direction is one of the X direction and the Y direction, and the second direction is the other one of the X direction and the Y direction.

3. The touch-panel device according to claim 2, wherein the parameter values for the positions of the plurality of sensors employed in the coordinate calculation process to perform the coordinate calculation process in the case where the periphery of the touch panel is touched are defined by coordinate values of both outer edges of two electrodes provided at an edge of the touch panel.

4. The touch-panel device according to claim 2, wherein, in the coordinate calculation process performed to perform the coordinate calculation process in the case where the periphery of the touch panel is touched, the sensor measured values to be referred to are each assigned a predetermined weight.

5. The touch-panel device according to claim 4, wherein the predetermined weight is varied in accordance with a touch size.

6. The touch-panel device according to claim 1, wherein the touched area is in a shape which has a constant ratio of a width thereof in the X direction to a width thereof in the Y direction.

7. The touch-panel device according to claim 1, wherein the touched area is one of the circular and oval in shape.

8. The touch-panel device according to claim 1, wherein the touched area is circular in shape.

9. The touch-panel device according to claim 2, wherein the touched area is circular in shape.

10. The touch-panel device according to claim 2, wherein the touched area is circular in shape.

* * * * *